United States Patent
Rodman

(10) Patent No.: US 10,173,789 B2
(45) Date of Patent: Jan. 8, 2019

(54) CELLULAR CORE COMPOSITE LEADING AND TRAILING EDGES

(71) Applicant: William L Rodman, Bellevue, WA (US)

(72) Inventor: William L Rodman, Bellevue, WA (US)

(73) Assignee: AEROSUD TECHNOLOGY SOLUTIONS (PTY) LTD., Pretoria, Gauteng (ZA)

(*) Notice: Subject to any disclaimer, the term of this patent is extended or adjusted under 35 U.S.C. 154(b) by 0 days.

(21) Appl. No.: 13/855,524

(22) Filed: Apr. 2, 2013

(65) Prior Publication Data

US 2013/0299061 A1    Nov. 14, 2013

Related U.S. Application Data

(60) Provisional application No. 61/619,000, filed on Apr. 2, 2012.

(51) Int. Cl.
| | |
|---|---|
| *B64F 5/00* | (2017.01) |
| *B64C 3/24* | (2006.01) |
| *B29C 70/44* | (2006.01) |
| *B29D 99/00* | (2010.01) |
| *B64F 5/10* | (2017.01) |
| *B64D 45/02* | (2006.01) |
| *B64C 3/14* | (2006.01) |

(52) U.S. Cl.
CPC ............ *B64F 5/0009* (2013.01); *B29C 70/44* (2013.01); *B29D 99/0025* (2013.01); *B64C 3/24* (2013.01); *B64F 5/10* (2017.01); *B64C 2003/147* (2013.01); *B64D 45/02* (2013.01); *Y02T 50/43* (2013.01); *Y10T 156/10* (2015.01)

(58) Field of Classification Search
CPC ......... B29C 41/00; B64F 5/0009; B64C 3/24; B64C 2003/147; B64D 45/02
USPC .......................................................... 156/60
See application file for complete search history.

(56) References Cited

U.S. PATENT DOCUMENTS

| 4,582,278 A | * | 4/1986 | Ferguson | .................. B64C 3/46 244/219 |
|---|---|---|---|---|
| 2009/0072439 A1 | * | 3/2009 | Karem | .......................... 264/258 |
| 2009/0208683 A1 | * | 8/2009 | Rodman | ................. B29C 33/76 428/35.7 |

(Continued)

OTHER PUBLICATIONS

"Wrapped-Spar Construction with Bagged Wings"—Jul. 12, 2004; p. 1, first and last figures; p. 2, last figure. Retrived from the Internet: ihttp://www.charlesriverrc.org/articles/supra/all%20PDFs/sparbuild.pdf.

*Primary Examiner* — Daniel McNally
(74) *Attorney, Agent, or Firm* — Lowe Graham Jones PLLC; Mark Lawrence Lorbiecki

(57) ABSTRACT

A complex-shaped, three-dimensional fiber reinforced composite trailing edge structure may be formed by using counteracting pressures applied to a structural lay-up of wetted fibers placed onto pressurizable members to form continuous fore and aft loops. In turn, the loops may be structurally functional to transfer loads from the trailing edge structure to a wing center section. The trailing structure may include may include fillers and/or a metallic insert, wherein the metallic insert may provide a lightening strike capability for the trailing edge structure.

6 Claims, 9 Drawing Sheets

(56) References Cited

U.S. PATENT DOCUMENTS

| | | | | |
|---|---|---|---|---|
| 2010/0155528 A1* | 6/2010 | Balsa Gonzalez | ........ | B64C 3/28 |
| | | | | 244/87 |
| 2010/0164147 A1* | 7/2010 | Rodman | ............. | B29C 43/3642 |
| | | | | 264/503 |
| 2010/0193636 A1* | 8/2010 | De Vita | ................ | B29C 66/721 |
| | | | | 244/123.1 |

* cited by examiner

CELLULAR CORE COMPOSITE LEADING AND TRAILING EDGES

PRIORITY CLAIM

This application claims priority from U.S. Provisional Patent Application No. 61/619,000 filed on Apr. 2, 2012, and the subject matter of which is incorporated herein by reference in its entirety.

FIELD OF THE INVENTION

The present invention generally relates to fiber-reinforced composite structures having one or more embedded cored member, such as a honeycomb sheet, and methods for manufacturing such composite structures.

BACKGROUND OF THE INVENTION

Leading and trailing edges perform high lift for many air and spacecraft. In addition to their defining shape, which has a large impact on the aerodynamic performance of a wing, their structural configuration and materials need to mitigate the effects of lightning, bird strike, heat buildup, "hangar rash", and other phenomenon. The leading and trailing edges also operate to "close out" the fore and aft portions of the wing while being structurally robust to transfer flight loads into the wing box.

A trailing edge typically includes (1) a configuration that incorporates taper and curvature desired by aerodynamicists (highly tapered and curved surfaces); (2) lightning strike provisions' (3) easy to manufacture; and (4) incorporates simple inspection and repair strategies.

BRIEF SUMMARY OF THE INVENTION

The present invention is generally directed toward processes and structures made by those processes in which complex-shaped, three-dimensional composite structures, specifically leading and trailing edge structures, may be produced using counteracting acting pressures applied to a structural lay-up of fiber plies where these pressures operate to embed or integrate cored members between fiber plies with the objectives of minimizing structural weight while increasing localized stiffness. In one embodiment, the arrangement of pressurizable members or cells creates an integrated monolithic trailing or leading edge structure. In the case of a trailing edge, the arrangement of the pressurizable members may take the form of an "un-reinforced" design or a "reinforced" design, as will be explained below in the detailed description.

In one aspect of the present invention, a method of manufacturing a trailing edge structure, the method including the steps of (1) arranging a plurality of pressurizable members within a tool, each of the pressurizable members having an outer surface and an inner surface defining a volumetric region, each of the pressurizable members further having an opening to permit internal pressurization thereof, wherein the arranged pressurizable members have an approximate configuration of a trailing edge feature; (2) arranging a plurality of fore and aft fiber plies onto at least one surface of the arranged pressurizable members, wherein the aft fiber plies form a continuous first loop and the fore fiber plies form a continuous second loop, and further wherein an intersection of the first and second loops is functionable as a load transferring spar, where a combination of the pressurizable members and fiber plies comprise a pre-cured assembly; (3) pressurizing an outer surface of the pre-cured assembly with a first pressure; and (4) pressurizing the inner surface of at least some of the pressurizable members with a second pressure, wherein the first pressure and the second pressure operate to compress the fiber plies between the pressurizable members and tool to form the trailing edge structure.

BRIEF DESCRIPTION OF THE DRAWINGS

Preferred and alternative embodiments of the present invention are described in detail below with reference to the following drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with composite structures, the tooling to produce the same, and methods of making, configuring and/or operating any of the above have not necessarily been shown or described in detail to avoid unnecessarily obscuring descriptions of the embodiments of the invention.

The present invention is generally directed to the leading and trailing edge structures for aerospace vehicles. U.S. patent application Ser. Nos. 11/835,261; 12/176,981; 12/330,391; and 12/565,602 describe how pressurizable members (also referred to herein as "cellular cores") may be arranged to produce complex-shaped composite assemblies and/or structures, and those patent applications are hereby incorporated by reference in their entireties. The present invention is further directed to overcoming the problems related to configuring, assembling and manufacturing trailing and leading edge structures that provide at least structural (e.g., less weight) and aerodynamic (e.g., sharp aft edge for improved airflow) advantages over conventional structures.

"Sharp" trailing edges are desirable because they do not leave vortices or negative pressure zones in the wake of the structure. In one embodiment, a trailing edge tapers to a pin point in thickness over a very long chord length. Conventional, state of the art design and manufacturing processes and fastening/bonding techniques result in blunt or less than optimal aerodynamic shapes primarily due to assembly considerations (for assembled structure), and processing considerations (for bonded structure).

Figure 1:
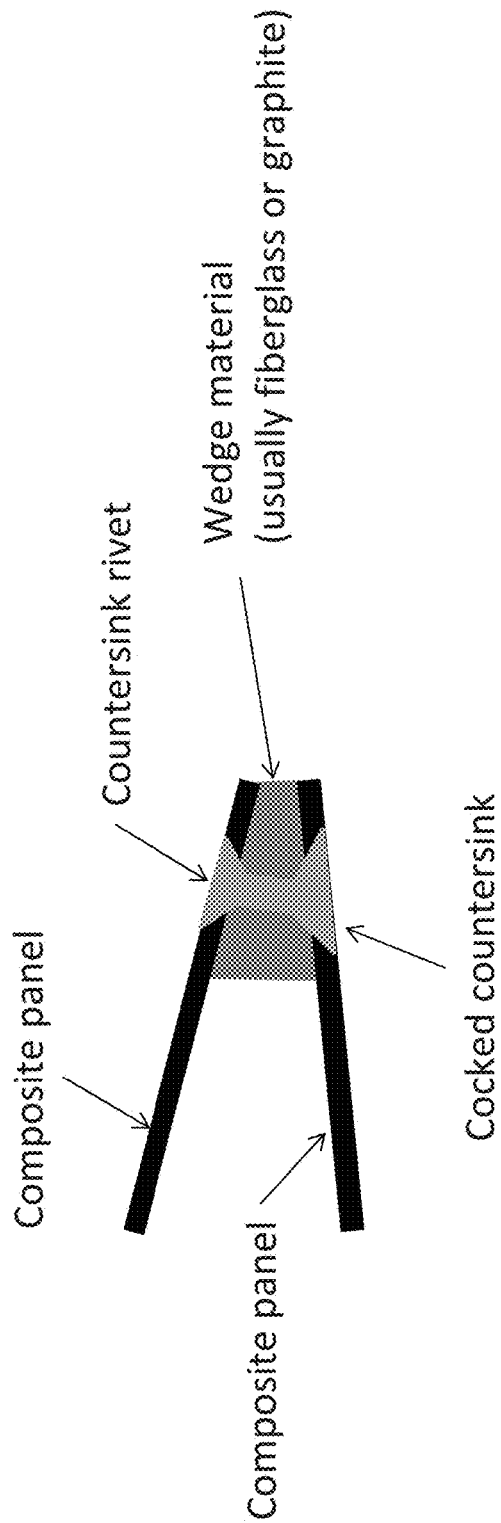
FIG. 1 is a schematic view of a prior-art trailing edge structure having a blunted aft edge.

FIG. 1 shows a prior-art panel (composite or metal) assembled with flush countersunk rivets. Each panel has a "minimum gauge" thickness of material required to prevent "pull through" (i.e., the countersink pulling through the material when the rivet is upset to join the pieces). The sheet thickness of the panel is normally maintained to the trailing edge because machining or configuring tapered panels is difficult. In the case of trailing edge designs, such as that illustrated in FIG. 1, a typical panel thickness may be in a range of about 0.070 inches to about 0.125 inches thick, which implies the step at the trailing edge may have a minimum be in a range of about 0.14 inches to about 0.25 inches thick. If one assumes the 0.14 inch thickness, and a wing span of forty-five feet, then this equates to a surface area of 0.14 inches×45 feet×12 inches=75.6 square inches orthogonal to the air stream. This orthogonal surface creates a negative pressure, or "drag," which may be considerable, and thus undesirable.

By comparison and according to an embodiment of the present invention, a trailing edge may be produced to have a much more tapered aft edge, such as a two degree taper, which could result in another four inches of chord (additional chord=0.14/sin(2°)). For the same 45 foot wing with a 0.5 pounds per square inch (psi) pressure between the upper and lower surfaces, this would result in an additional 1080 lbs of lift=0.5 PSI×45 feet×12 inches×4 inches), which could provide a lift benefit to have four additional passengers on the aircraft. Because materials are not infinitely strong, tapering down to a pin point is not possible. However, taking a high strength material, such as carbon-epoxy composite to a practical limit of for example, 0.040 inches of thickness cannot be accomplished using known manufacturing techniques and/or processes.

Figure 2:
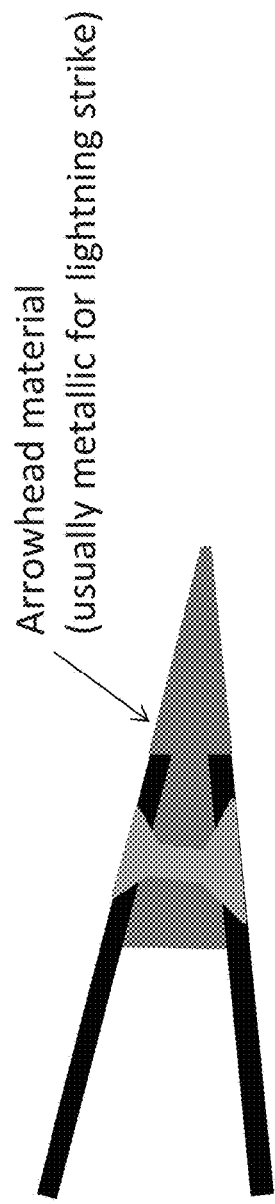
FIG. 2 is a schematic view of a prior-art arrowhead, assembled trailing edge structure.

FIG. 2 shows a prior-art "arrowhead" design for a trailing edge structure. The arrowhead configuration has its own advantages and disadvantages. Arrowhead designs have a limit to the amount of taper that can be effectively achieved (i.e., as the taper angle diminishes, the thickness required to install the fasteners, as well as achieve enough thickness in the neck of the arrowhead to withstand the sonic/buffeting loads usually exceeds the taper angle desired for adequate aerodynamic operation). Therefore, there are only certain cases where the taper angle is steep enough to allow the arrowhead design illustrated in FIG. 2.

Typically, arrowhead designs are limited to smaller structures with limited chord depth. Large panels, such as flaps, rudders, and elevators, have small taper angles, and arrowhead designs cannot be configured to achieve minimum gauge as well as result in a desired chord. So, when comparison studies are performed on large panels, a trailing edge design such as the one illustrated in FIG. 3 is typically chosen over the configuration illustrated in FIG. 2.

Figure 3:
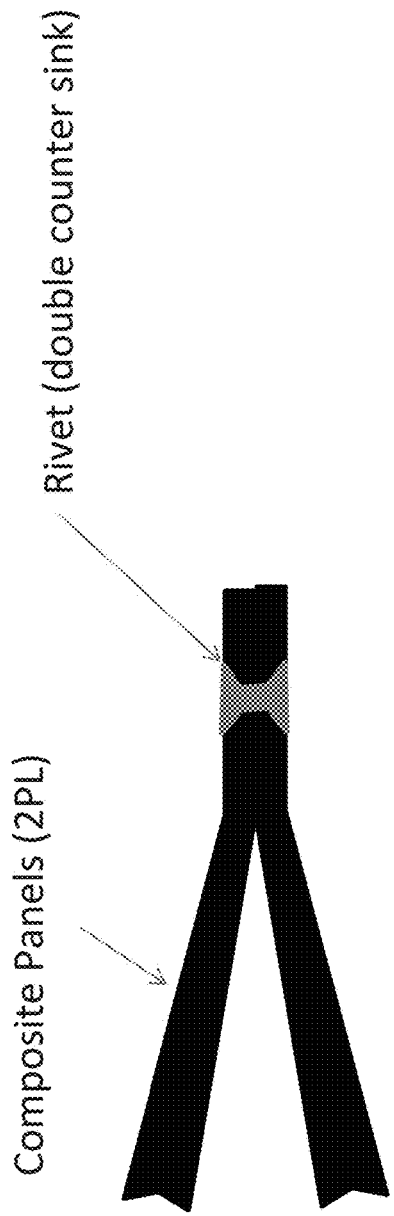
FIG. 3 is a schematic view of a prior-art, conventional trailing edge structure that may be, but not necessarily, used on rudders, elevators and trailing edge flaps.

FIG. 3 trailing edges have the same thickness problems as discussed for the FIG. 1 close outs, with the added problem of changing the desired air flow at the "kink" of the panel. This kink results in the same negative pressure issues discussed for the FIG. 1 design.

Figure 4:
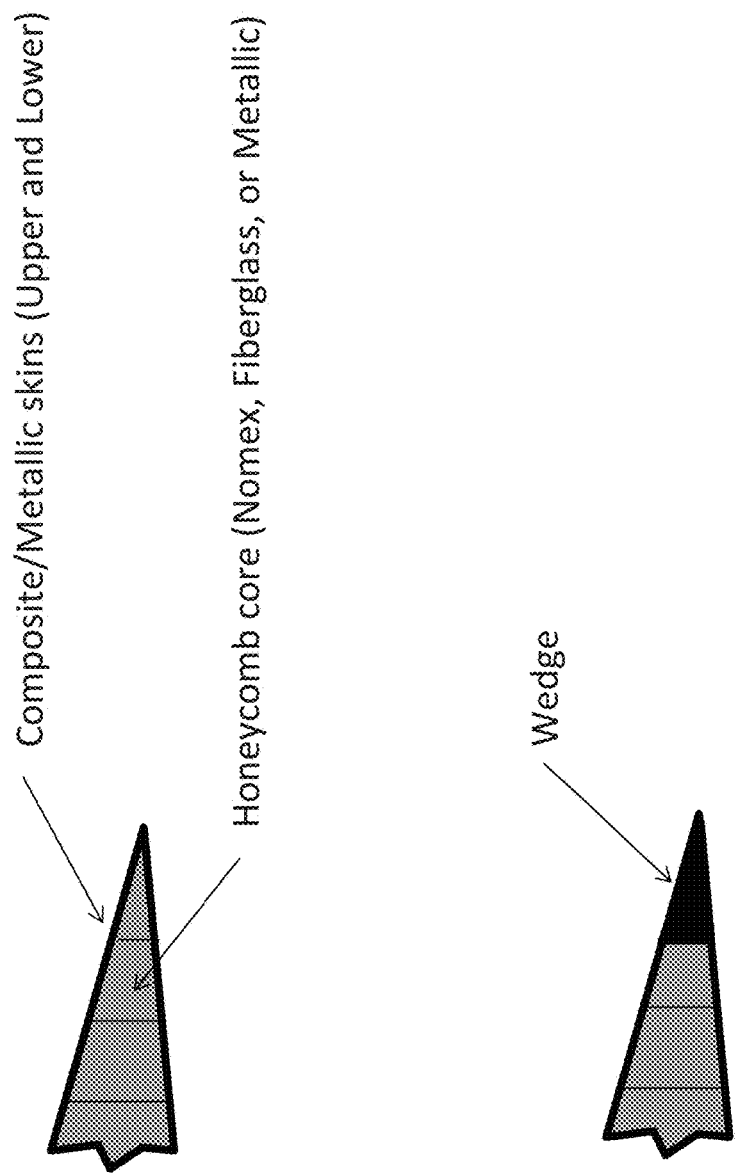
FIG. 4 shows prior-art trailing edge structure having a full depth core configuration.

FIG. 4 shows a full depth honeycomb core trailing edge. Full depth core designs are common, but have some inherent problems. First, if they do not incorporate a wedge at the end, they are inherently weak along their bond line between the upper and lower skins. Further, if they do incorporate a wedge, depending on the tooting configuration, it may have to be machined with the honeycomb in order to ensure a smooth transition between the core and the wedge. Lastly, full depth honeycomb core designs are usually limited to depths of six inches or less due to inspection and weight issues. So, their use overall is limited to smaller structures. One particular advantage of a full depth honeycomb design is that aerodynamicists can achieve the degree of taper desired. In order to take advantage of this capability on large panel designs, a full depth core trailing edge is often attached to the structure through a trailing edge spar, which has the effect of placing a lot of weight at the trailing edge. This extra weight can cause flutter problems with the design. Often, these flutter problems cannot be overcome because the only solutions is to add more strength or stiffness to the design, which is the equivalent of adding even more material and weight.

Figure 5:
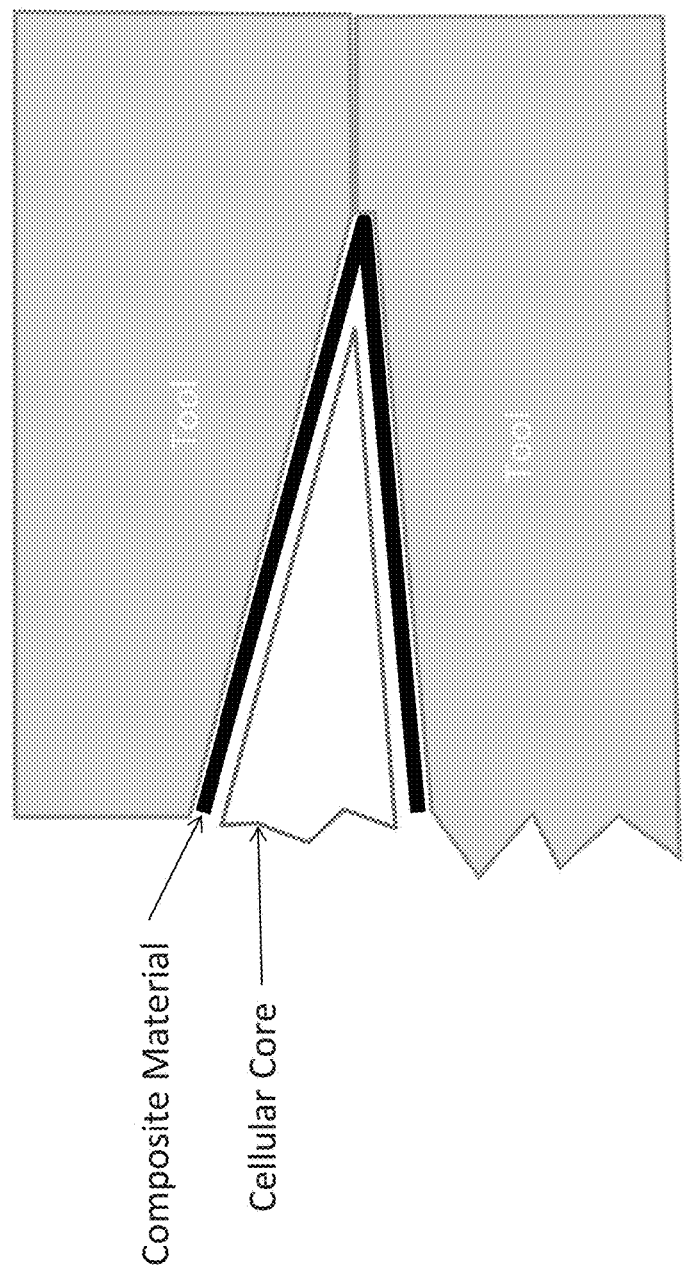
FIG. 5 is a cross-sectional vie of an un-reinforced trailing edge structure according to an embodiment of the invention.

Now referring to one or more embodiments of the present invention, an un-reinforced trailing edge design is one where the aft cell creates the whole trailing edge feature. FIG. 5 shows an example of an un-reinforced trailing edge. In this case, the aft cell is designed to incorporate all of the taper and curvature required. It should be noted that the process required to produce the trailing edge with this tapered aft cell may include the arrangement of pressurizable members or cells to form the trailing edge and then using counteracting acting pressures applied to a structural lay-up of fiber plies where both internal and external pressures operate to form the trailing edge having one or more of the following advantages as compared to conventional trailing edge structures: (1) reducing structural weight; (2) increasing load carrying capability (3) achieving improved aerodynamic performance; (4) having lightening strike capability; (5) easy and repeatable to manufacture; and/or (6) lower cost and assembly time.

Some conventional processes of techniques that could be considered to make the trailing edge illustrated in FIG. 5 include (1) rotational molding; (2) stretch blow molding; (3) extrusion blow molding; (4) twin sheet vacuum forming; (5) selective laser sintering (SLS); and (6) stereo lithography (SLA). Rotational molding usually requires a minimum of 0.25 inches of clearance between the upper and lower surfaces to allow the ground thermoplastic powders to coat the mold surface and not get stuck in the pinching cavity. This precludes a thin trailing edge created by rotationally molded cell. Stretch blow molding would cause the expanding molten materials to chill against the tool, and, thereby, thin excessively, and perhaps "pop" as it expanded into the pinched area.

Extrusion blow molding could potentially create a taper as shown, but the actuation of the mold against the extruded column of plastic material would have to be carefully considered. Twin sheet vacuum forming processes may possibly create a taper as shown, as could the SLS and SLA processes. Nevertheless while some of these processes may achieve a desired end-product, these processes cannot achieve the time, cost and repeatability when compared to one or more of the processes that form part of the present invention.

Figure 6:
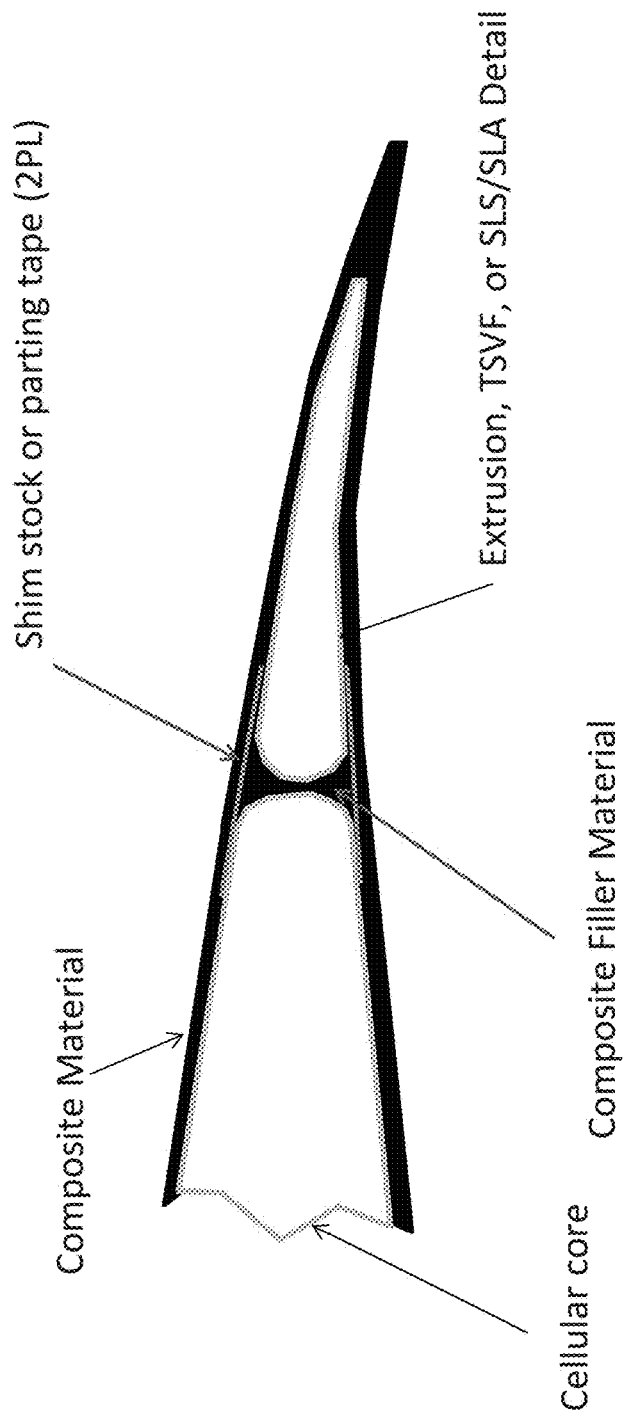
FIG. 6 is a cross-sectional view of an another un-reinforced trailing edge structure having an arrowhead configuration according to an embodiment of the invention.

FIG. 6 shows a specialized case of an un-reinforced trailing edge that may be created using a combination of cellular cores and an extrusion. In this case, shim stock or parting film (or tape are used to join a normally produced cellular core (such as with rotational molding) with a hollow extrusion to create the trailing edge configuration. Composite filler material may be used, but is not required to be used, between them, depending on the exact shape of the forward cell and the aft extrusion. The aft extrusion is pressurized by extending it through the mold at either or both ends. The extension of at least one open end out of the mold has the effect of enabling a pressurized air source to inflate the inside surface of the extrusion. One of the ends may be sealed such that the extrusion would not have to pass through both sides of the mold. It should be noted that thermoplastic extrusions can be created with wall thicknesses of less than 0.015 inches and internal radii of less than 0.015 inches at the trailing edge. This means that total extrusion thickness at the trailing edge can be less than 0.045 inches in thickness. Consequently, FIG. 6 also indicates an improved aerodynamic shape that begins to take advantage of the highly desired reduced trailing edge thickness. In fact, with a simple layup and tooling technique, the ply layup beyond the extrusion can be designed to taper to about 0.040 inches. Lastly, it should be noted that the cellular cores, extrusions, parting tapes/shims, etc. may be removed from the cured composite end-product unless specifically designed to remain.

Figure 7:
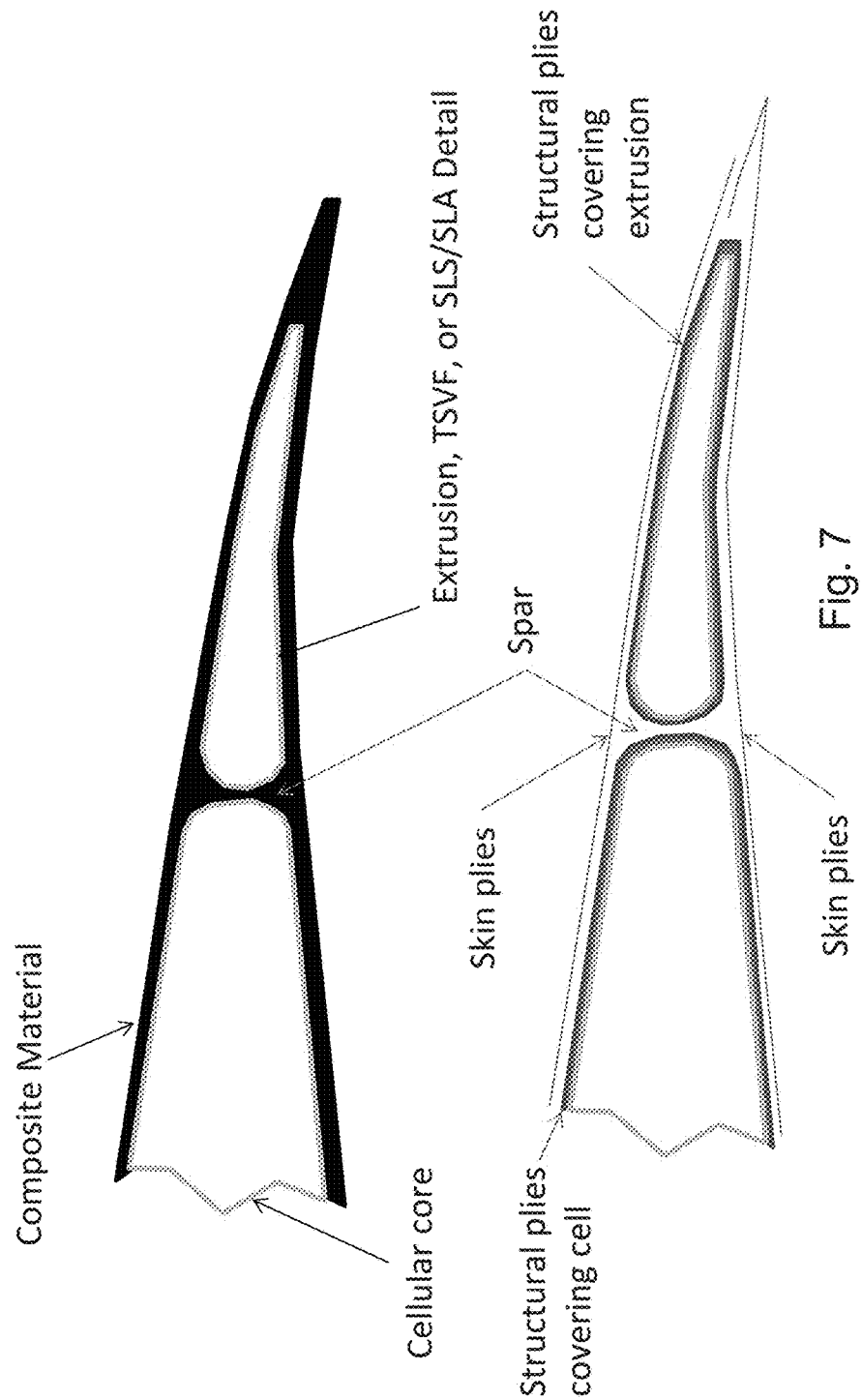
FIG. 7 is a cross-sectional view of an reinforced trailing edge structure according to an embodiment of the invention.

In another embodiment of the present invention, a reinforced trailing edge design is one where an aft cell is used in combination with an extrusion, twin sheet vacuum formed detail, or an SLS/SLA detail similar to the FIG. 6 configuration. FIG. 7 shows a forward cell that is wrapped with structural plies. The aft cell (extrusion, TSVF, SLS/SLA detail) is also wrapped with structural plies, A "noodle" or filler material may be inserted between the two to act as a "radius filler" (common practice in the composites design and manufacturing technology). Consistent with previously disclosed cellular core layup practice, the cells and filler are placed into the mold. Once installed and skin plies are overlaid and interleaved together, the mold is closed and the component cured. This configuration creates a unique structural capability not present in any trailing edge methodology described so far. Not unlike other designs, the skin plies are continuous to the end of the part. However, the aft cell plies form a loop of their own that, in part, form a "spar" at the point where they contact the forward cell. The forward cell plies also form their own loop that creates the opposing side of the "spar." In this configuration, the forward panel loads may be designed to completely react loads through the spar, which, in essence, allows designers to consider the skins aft of the spar to be "non-structural" (i.e., the skins aft of the spar would not carry any loads that could cause loss of the structure if disrupted). In turn, it is possible that such a configuration could result in the skins aft of the spar receiving a non-structural classification, which would allow repairs to trailing edge using "non-structural" methods, such as putty and wet laid fiberglass, as opposed to hot bonded or autoclave cured prepreg repairs. With exception to lightning strike capability, the reinforced cellular core approach to making trailing edges is superior to design and manufacturing methods known to date.

Figure 8:
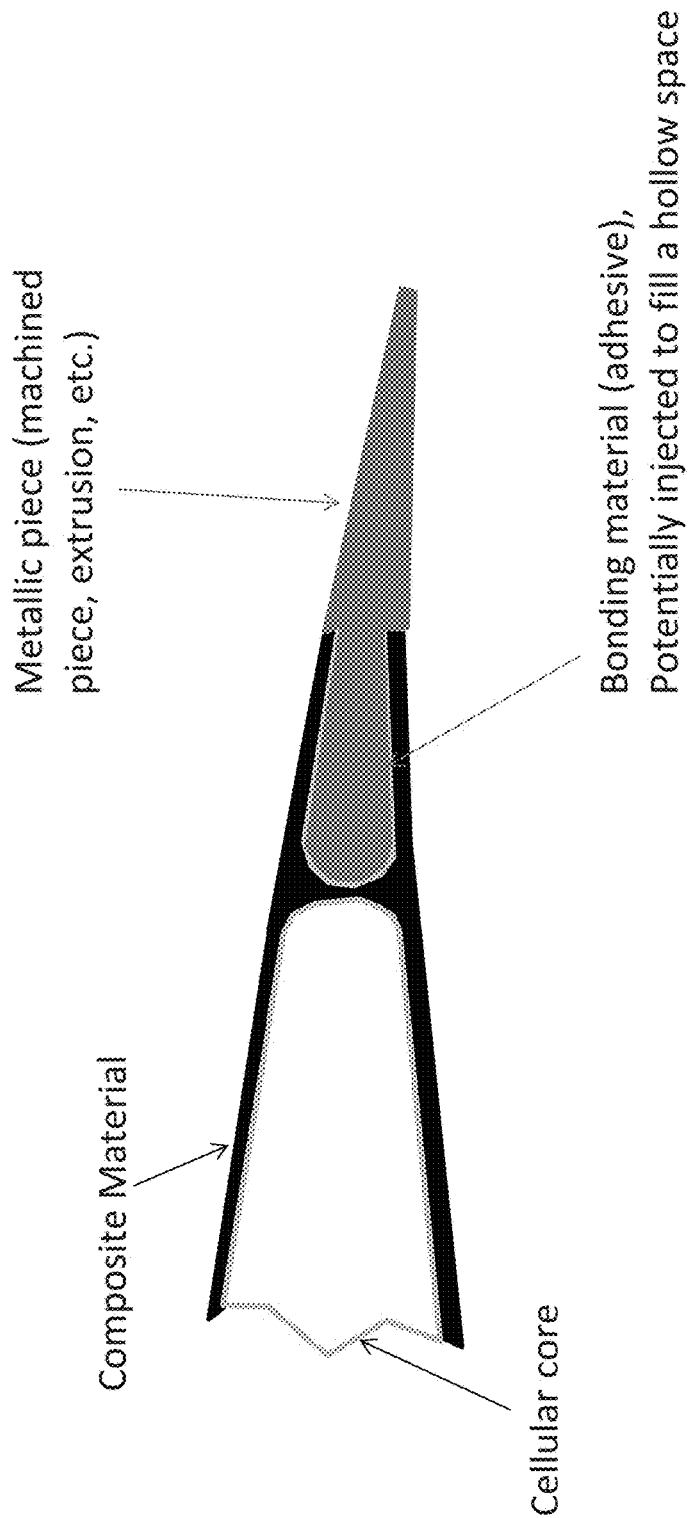
FIG. 8 is a cross-sectional view of an reinforced trailing edge structure having a lightning strike capability according to an embodiment of the invention.
Figure 9:
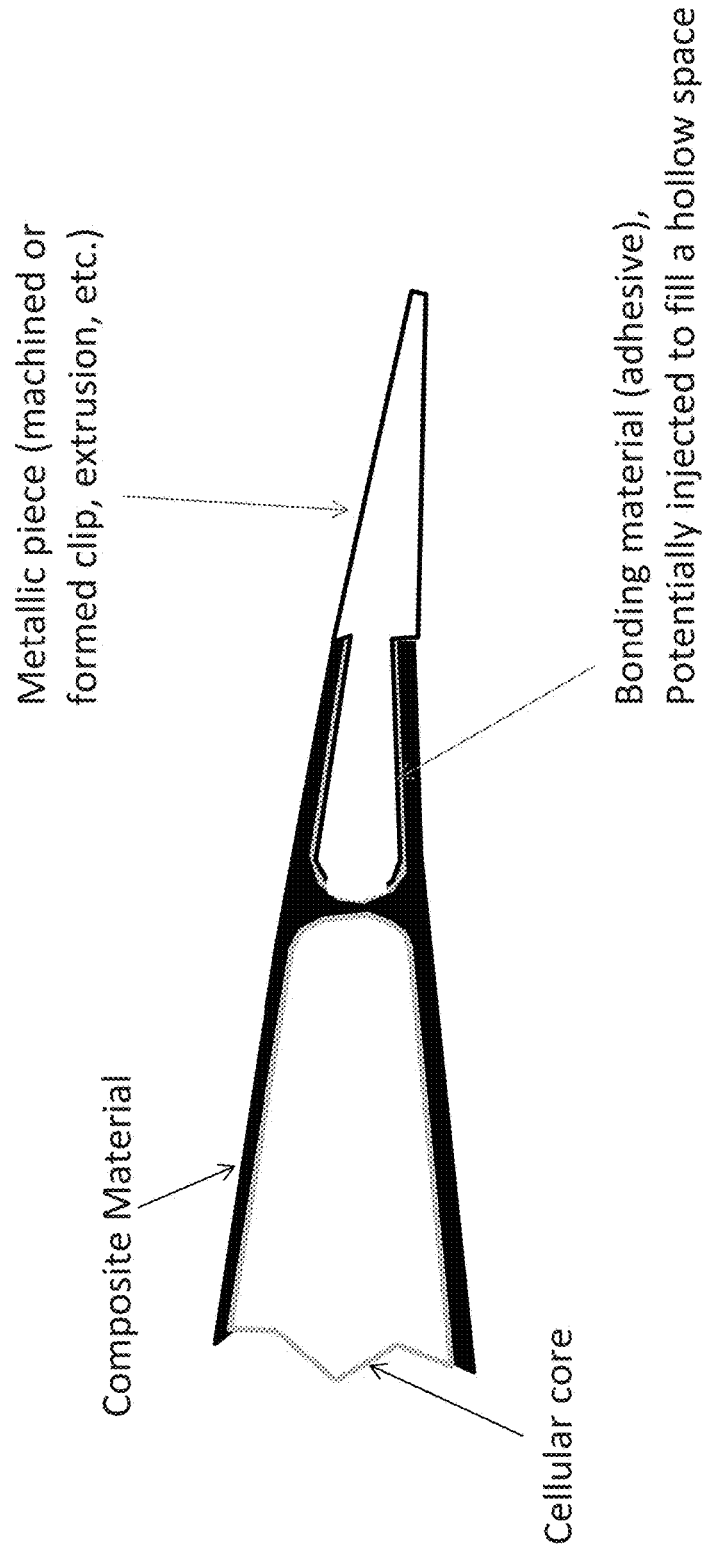
FIG. 9 is a cross-sectional view of another reinforced trailing edge structure having a lightning strike capability according to an embodiment of the invention.

FIG. 8 shows another embodiment of a reinforced trailing edge manufactured as generally described above, but where an end is portion has been removed to form a clip. A metallic arrowhead detail is then fitted inside the clip. The metallic detail could be a solid or hollow shape made from an extrusion or machined part. It could also be a formed sheet metal "V" shaped clip that is sprung into the hollow as illustrated in FIG. 9. Before, after, or during assembly, the hollow section in FIG. 9 could be injected with adhesive or potting material to stabilize it and bond the clip to the structure. It should be noted that the overall width of the metallic piece is significantly smaller than the arrowhead configuration illustrated in and described relative to FIG. 2.

By way of example, the clip in the illustrated embodiment may be no greater than 0.5 inches in width, compared to the 2-3 inches required to install fasteners in the FIG. 2 design. If a metallic arrowhead is used, the illustrated embodiment may include an inherent lightning strike capability, which is difficult and more expensive to achieve with other conventional manufacturing methods.

Lastly, it should be noted that the potential to use an extrusion, twin sheet vacuum formed, or SLS/SLA trailing edge cell with conventional manufacturing methods, such as full depth honeycomb core is plausible, and this invention extends into those methodologies.

The various embodiments described above can be combined to provide further embodiments. All of the above U.S. patents, patent applications and publications referred to in this specification are incorporated herein by reference. Aspects can be modified, if necessary, to employ devices, features, and concepts of the various patents, applications and publications to provide yet further embodiments While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method of manufacturing an airfoil with a trailing edge, the method comprising:
   arranging a plurality of pressurizable members within a tool, the pressurizable members comprising a forward pressurizable member and an aft pressurizable member, the aft pressurizable member having an outer surface and an inner surface defining a volumetric region having a tapered trailing edge airfoil shape, the aft pressurizable member further having an opening to permit direct internal pressurization thereof, wherein the arranged pressurizable members have an approximate configuration of an airfoil;
   overlaying and interleaving a plurality of fiber plies onto the plurality of pressurizable members, wherein fiber plies formed around the aft pressurizable member make a continuous first loop and fiber plies formed around the forward pressurizable member make a continuous second loop to include forward panels, wherein an intersecting region of the first and second loops form a load transferring spar, configured such that forward panel loads react loads through the load transferring spar and wherein the pressurizable members and the fiber plies comprise a pre-cured assembly;
   pressurizing an outer surface of the pre-cured assembly with a first pressure; and
   pressurizing the inner surface of at least the aft pressurizable member with a second pressure, wherein the first pressure and the second pressure operate to compress the fiber plies between the pressurizable members and the tool to form the airfoil.

2. The method of claim 1, comprising the further step of producing a pressurizable member by a method selected from a group comprising:
   (1) rotational molding;
   (2) stretch blow molding;
   (3) extrusion blow molding;
   (4) twin sheet vacuum forming;
   (5) selective laser sintering (SLS); and
   (6) stereo lithography (SLA).

3. The method of claim 2, further including the insertion of an extruded trailing edged onto which the step of overlaying and interleaving a plurality of fiber plies onto the plurality of pressurizable members occurs.

4. The method of claim 1, further comprising inserting a noodle or filler material between the fiber plies formed around the forward pressurizable member and the fiber plies formed around the aft pressurizable member.

5. The method of claim 1, wherein the step of overlaying and interleaving a plurality of fiber plies onto the plurality of pressurizable members, further includes classifying all skins aft of the load transferring spar as "nonstructural."

6. The method of claim 1, encompassing the further step of removing an end portion aft of the load transferring spar to form a clip and bonding a metallic arrowhead detail within the clip.

* * * * *